US008984495B2

(12) United States Patent
Guarnieri et al.

(10) Patent No.: US 8,984,495 B2
(45) Date of Patent: Mar. 17, 2015

(54) ENHANCED STRING ANALYSIS THAT IMPROVES ACCURACY OF STATIC ANALYSIS

(71) Applicant: International Business Machines Corporation, Armonk, NY (US)

(72) Inventors: Salvatore A. Guarnieri, New York, NY (US); Marco Pistoia, Amawalk, NY (US); Takaaki Tateishi, Kanagawa-ken (JP); Omer Tripp, Har-Adar (IL)

(73) Assignee: International Business Machines Corporation, Armonk, NY (US)

( * ) Notice: Subject to any disclaimer, the term of this patent is extended or adjusted under 35 U.S.C. 154(b) by 97 days.

(21) Appl. No.: 13/733,417

(22) Filed: Jan. 3, 2013

(65) Prior Publication Data

US 2014/0189657 A1    Jul. 3, 2014

(51) Int. Cl.
G06F 9/44          (2006.01)
G06F 11/36         (2006.01)

(52) U.S. Cl.
CPC ................................. G06F 11/3604 (2013.01)
USPC ........................... 717/133; 717/131; 717/132

(58) Field of Classification Search
None
See application file for complete search history.

(56) References Cited

U.S. PATENT DOCUMENTS

| | | |
|---|---|---|
| 2006/0230393 A1 | 10/2006 | Doh et al. |
| 2007/0006194 A1 | 1/2007 | Mejri et al. |
| 2010/0043048 A1 | 2/2010 | Dolby et al. |
| 2010/0223599 A1 | 9/2010 | Ghosh et al. |
| 2010/0333201 A1 | 12/2010 | Haviv et al. |
| 2011/0029946 A1 | 2/2011 | Joukov et al. |
| 2011/0088023 A1* | 4/2011 | Haviv et al. .................. 717/155 |
| 2011/0145785 A1 | 6/2011 | Centonze et al. |
| 2012/0096440 A1 | 4/2012 | Tateishi et al. |
| 2012/0131668 A1 | 5/2012 | Berg et al. |
| 2012/0185943 A1 | 7/2012 | Tripp |
| 2012/0233584 A1 | 9/2012 | Ivancic et al. |
| 2012/0254839 A1 | 10/2012 | Fink et al. |

OTHER PUBLICATIONS

Sawin, "Improving the Static Resolution of Dynamic Java Features," The Ohio State University, 2009.*
Wei et al., "A Practical Blended Analysis for Dynamic Features in JavaScript," 2012 Technical Report TR-12-18, Department of Computer Science, Virginia Tech.*
Just et al., "Information Flow Analysis for JavaScript," ACM, 2011.*
Tripp et al., "Hybrid Analysis for JavaScript Security Assessment," ACM 2010.*
Tateishi et al., "Path- and Index-sensitive String Analysis Based on Monadic Second-order Logic," ACM 2010.*
Biggar et al., "Static analysis of dynamic scripting languages," Aug. 2009.*
Christensen et al., "Precise Analysis of String Expressions," Springer-Verlag Berlin Heidelberg 2003.*

(Continued)

*Primary Examiner* — Insun Kang
(74) *Attorney, Agent, or Firm* — Harrington & Smith (57) ABSTRACT

A method includes determining, as part of a static analysis of a program, links between functions in the program and performing, as part of the static analysis, string analysis on strings used in the program to determine additional links between the functions in the program. The method further includes outputting, as part of the static analysis, indications of at least the links between the functions and the additional links between the functions. Apparatus, computer programs, and program products are also disclosed.

23 Claims, 6 Drawing Sheets

(56) References Cited

OTHER PUBLICATIONS

Wei, "Blended Analysis for JavaScript a Practical Framework to Analyze Dynamic Features," SPLASH 2012.*

IP.COM et al.; "Prioritized Impact Analysis Combined By Static And Dynamic Analysis", IPCOM000216401D, Apr. 4, 2012, pp. 1-3.

Sawin et al.; "Assumption Hierarchy For A CHA Call Graph Construction Algorithm", SCAM 11th IEEE International Working Conference on, Sep. 25-26, 2011, pp. 35-44.

Christensen et al., "Precise Analysis of String Expressions", Basic Research in Computer Science, Feb. 2003, 18 pgs.

Tateishi et al., "Path-and Index-sensitive String Analysis Based on Monadic Second-order Logic", ISSTA'11, Jul. 17-21, 2011, Toronto, ON, Canada, 11 pgs.

* cited by examiner

ENHANCED STRING ANALYSIS THAT IMPROVES ACCURACY OF STATIC ANALYSIS

BACKGROUND

This invention relates generally to analysis of programs and, more specifically, relates to static analysis of programs.

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

Languages with dynamic code execution, such as JAVASCRIPT®, present a challenge for static analysis. JAVASCRIPT® is a scripting language commonly implemented as part of a web browser. Static analyses are run over code before the code is executed, so the analyses can only analyze code that is statically known. In particular, call graph generation and pointer analysis will be incomplete and possibly incorrect without knowledge of all the code that could be executed. Modular analysis and incremental analysis allow a static analysis to analyze a program in parts then combine the results into one final result. These types of static analyses still suffer from only being able to analyze code that is known to exist statically, and they are not solutions to finding and analyzing dynamically executed code. Furthermore, JAVASCRIPT® does not have a strong module system so a piece of code could impact every piece of the whole program.

Typically, statements that execute code dynamically are ignored in static analyses for JAVASCRIPT®. Dynamic analyses, which run concurrently with the program, can analyze dynamically executed code, but there are limitations to dynamic analyses. First, the dynamic analyses must run while the program is run so there is some amount of overhead in running the analysis. Second, dynamic analyses do not alert the developer to problems during development since these analyses only analyze programs that are being executed.

Third, to incorporate dynamic analysis into a developer tool, the developer can write test cases that will execute the program and allow the dynamic analysis to run. Any program point not reached by a test case will not be analyzed by the dynamic analysis. So the dynamic analysis has limited coverage. By contrast, static analysis can be run without executing the program and static analysis examines all possible program paths. For these reasons, it is important to improve the handling of dynamically executed code in a static analysis.

BRIEF SUMMARY

The following summary is merely intended to be exemplary. The summary is not intended to limit the scope of the claims.

In an exemplary embodiment, a method includes determining, as part of a static analysis of a program, links between functions in the program. The method includes performing, as part of the static analysis, string analysis on strings used in the program to determine additional links between the functions in the program. The method further includes outputting, as part of the static analysis, indications of at least the links between the functions and the additional links between the functions.

An additional exemplary embodiment includes a computer program, comprising code for determining, as part of a static analysis of a program, links between functions in the program; code for performing, as part of the static analysis, string analysis on strings used in the program to determine additional links between the functions in the program; and code for outputting, as part of the static analysis, indications of at least the links between the functions and the additional links between the functions; when the computer program is run on a processor. The computer program according this paragraph, wherein the computer program is a computer program product comprising a computer-readable medium bearing computer program code embodied therein for use with a computer.

An exemplary computing system includes one or more processors and one or more memories including computer program code. The one or more memories and the computer program code are configured to, with the one or more processors, cause the apparatus to perform at least the following: determining, as part of a static analysis of a program, links between functions in the program; performing, as part of the static analysis, string analysis on strings used in the program to determine additional links between the functions in the program; and outputting, as part of the static analysis, indications of at least the links between the functions and the additional links between the functions.

Another exemplary embodiment comprises means for determining, as part of a static analysis of a program, links between functions in the program; means for performing, as part of the static analysis, string analysis on strings used in the program to determine additional links between the functions in the program; and means for outputting, as part of the static analysis, indications of at least the links between the functions and the additional links between the functions.

An exemplary computer program product includes a computer-readable medium bearing computer program code embodied therein for use with a computer. The computer program code includes: code for determining, as part of a static analysis of a program, links between functions in the program; code for performing, as part of the static analysis, string analysis on strings used in the program to determine additional links between the functions in the program; and code for outputting, as part of the static analysis, indications of at least the links between the functions and the additional links between the functions.

DETAILED DESCRIPTION

Figure 1A:
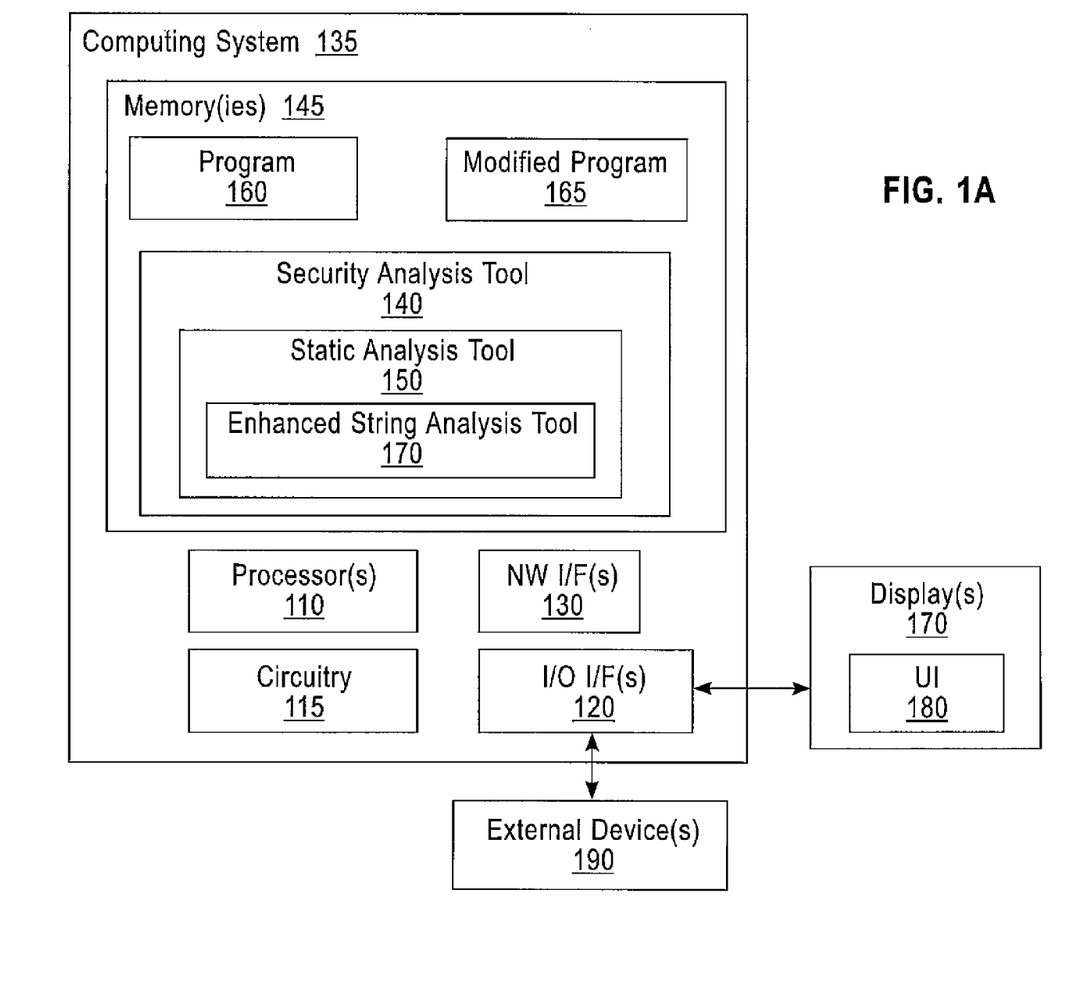
FIG. 1A is a block diagram of an exemplary computing system suitable for us the exemplary embodiments herein.

Before proceeding with additional description regarding problems associated with current static and dynamic analyses, reference is now made to FIG. 1A for an overview of a computing system 135 suitable for use with exemplary embodiments herein. The computing system 135 comprises one or more memories 145, one or more processors 110, one or more I/O interfaces 120, and one or more wired or wireless network interfaces 130. The computing system 135 is coupled to or includes one or more displays 170 and one or more external device(s) 190. This example provides a program 160 and modified program 165 in the one or more memories 145. The one or more memories 145 also include a security analysis tool 140 as, in an exemplary embodiment, computer-readable program code that is executable by the one or more processors 110 to cause the computing system 135 to perform one or more of the operations described herein. In another example, the operations may also be performed, in part or completely, by circuitry 115 that implements logic to carry out the operations. The circuitry 115 may be implemented as part of the one or more processors 110 or may be separate from the one or more processors 110. The processors 110 may be any processing unit, such as a digital signal processor and/or single-core or multi-core general purpose processors. The circuitry 115 may be any electronic circuit such as an application specific integrated circuit or programmable logic. The memories 145 may comprise non-volatile and/or volatile RAM, cache memory, NAND-based flash memory, long term storage (e.g., hard drive), and/or read only memory. The one or more I/O interfaces 143 may include interfaces through which a user may interact with the computing system 135. The display(s) 170 may be a touchscreen, flatscreen, monitor, television, projector, as examples. A user interacts with the security analysis tool 140 through the UI (user interface) 180. The external device(s) 190 enable a user to interact with the computing system 135 and may include a mouse, trackball, keyboard, and the like. The network interfaces 142 may be wired or wireless and may implement a number of protocols, such as cellular or local area network protocols. The elements in computing system 135 may be interconnected through any technology, such as buses, traces on a board, interconnects on semiconductors, and the like.

In this example, the security analysis tool 140 includes a static analysis tool 150 and an enhanced string analysis tool 170. The static analysis tool 150 performs an analysis of computer software in the program 160 that is performed without actually executing the program 160. In most cases, the analysis is performed on some version of the source code for the program 160, and in other cases some form of object code of the program 160. The enhanced string analysis tool 170, in an exemplary embodiment, performs operations on the program 160 and may create the modified program 165, as described in more detail below.

Figure 1B:
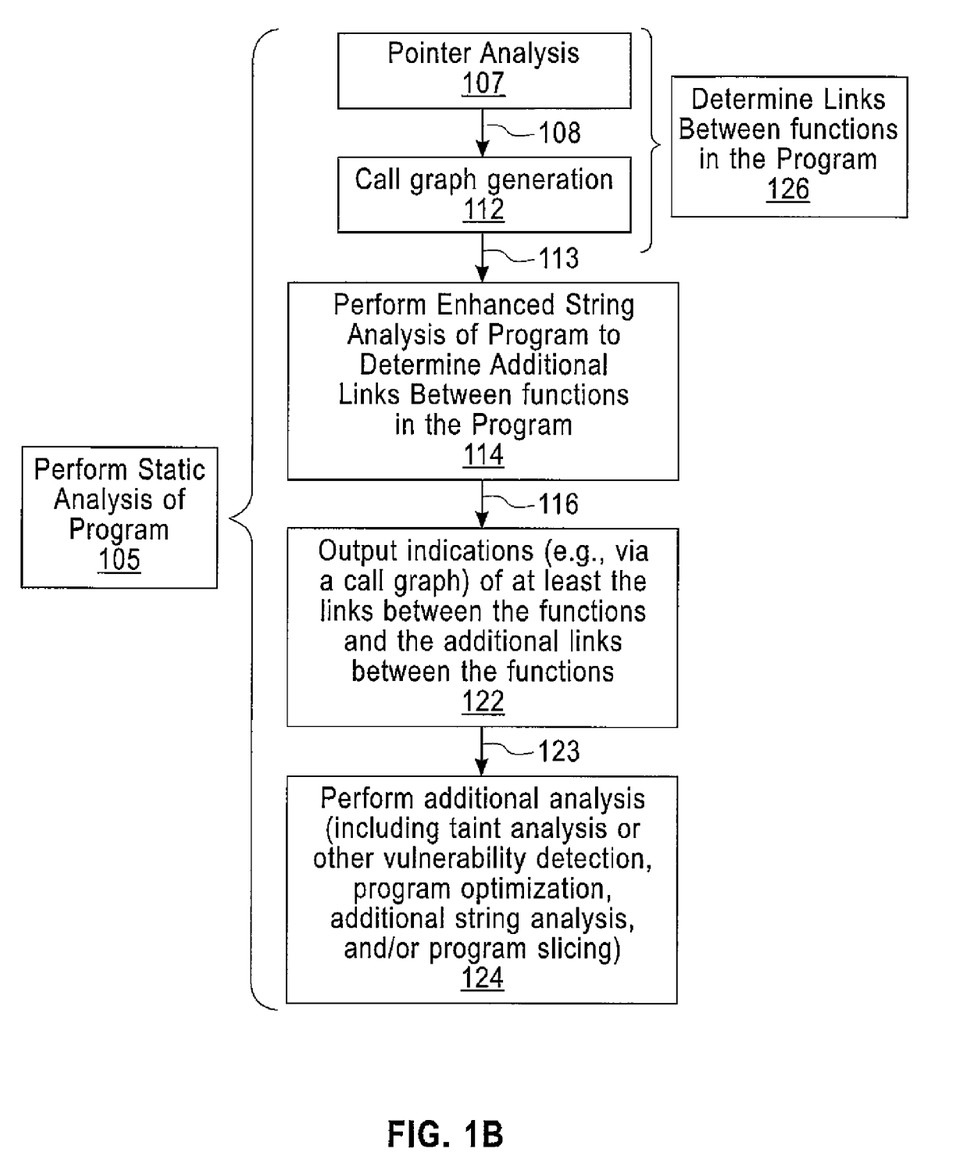
FIG. 1B is a logic flow diagram for static analysis and illustrates the operation of an exemplary method, a result of execution of computer program instructions embodied on a computer readable memory, and/or functions performed by logic implemented in hardware, in accordance with an exemplary embodiment of this invention.

FIG. 1B is a logic flow diagram for static analysis. FIG. 1B is used to illustrate an exemplary overview of operations the computing device 135 may perform and illustrates how the enhanced string analysis performed herein may interact with a system for performing static analysis. FIG. 1B further illustrates the operation of an exemplary method, a result of execution of computer program instructions embodied on a computer readable memory, and/or functions performed by logic implemented in hardware, in accordance with an exemplary embodiment of this invention.

In an exemplary embodiment, the computing device 135 is to perform a static analysis (block 105) of program 160. As previously stated, static analysis is the analysis of a program that is performed without actually executing the program. Instead of executing the program, models of the program are determined and analyzed, and such models may include a call graph, heap models, and the like. Static analysis may be performed for many different reasons, some of which are discussed below in reference to block 124. Static analysis is an analysis of source code (written in a programming language and comprising a text listing of commands to be compiled or assembled into an executable computer program) and/or byte code (a form of instruction set designed for efficient execution by a software interpreter) of the program 160. In this example, the static analysis of block 105 includes pointer analysis 107. In block 112, a call graph (examples of which are shown in FIGS. 2-5) is generated. Pointer analysis is accompanied by call graph generation to identify to what program variables (including function variables) point. In the examples presented below, if there is the statement in source code of "var f=add; f(10,10)", the pointer analysis performed in block 107 reports (e.g., via output 108) that "f" points to the value of "add", and the call graph generation in block 112 uses this result to determine functions called by "f(10,10)". Indications 113 of a call graph are output by block 112. It is noted that in one example, blocks 107 and 112 determine (block 126) links between functions in the program, e.g., via the resultant call graph.

In block 114, the computing device 135 performs enhanced string analysis of the program 160 to determine additional links between functions in the program 160. In examples herein, a modified program 165 may be created during this process. Additionally, the call graph may be modified and indications 116 would include the modifications. In block 122, the computing device 135 outputs indications (e.g., via a call graph) of at least the links between the functions and the additional links between the functions. Typically, the output 123 includes indications of a modified call graph. In block 124, the computing device 135 performs additional static analysis. Such static analysis may include taint analysis or other vulnerability detection, program optimization, additional string analysis, and/or program slicing.

Returning to current static and dynamic analysis, additional detail regarding problems with these is now presented. As stated above, it is important to improve the handling of dynamically executed code in a static analysis. In JAVASCRIPT®, one of the most common ways to execute code dynamically is with the eval function. The programmer passes a string to eval and the JAVASCRIPT® interpreter executes the string as JAVASCRIPT® code. One example use of eval is to access properties of objects: Eval("foo[" +field+ "]=10"). This is possible to accomplish without using "eval: foo[field]=10". However, there is nothing forcing programmers to use the more efficient way (that is, without using eval) to access properties in JAVASCRIPT®.

Figure 2:
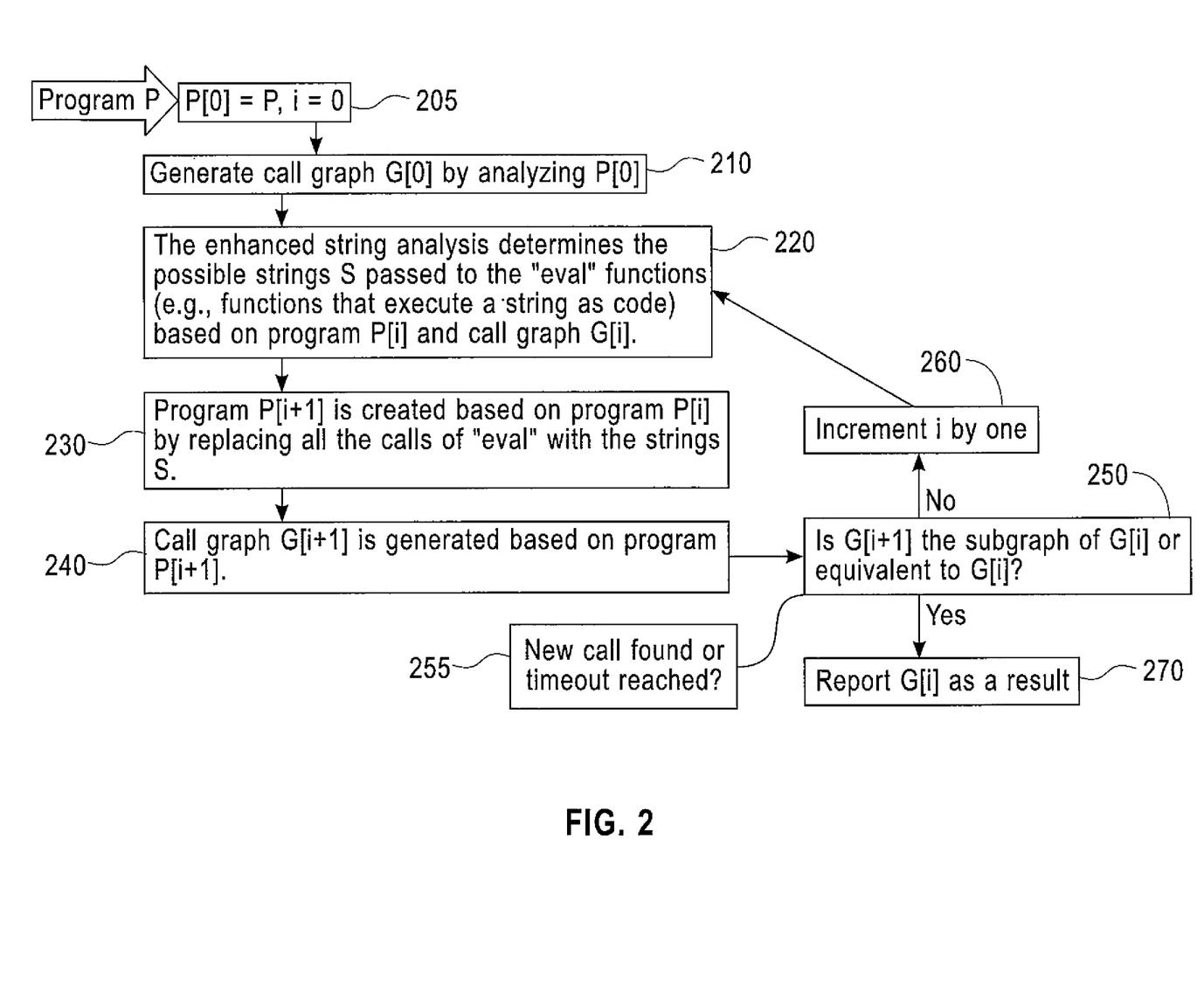
FIG. 2 is a logic flow diagram for string-analysis-enhanced call graph and pointer analysis and illustrates the operation of an exemplary method, a result of execution of computer program instructions embodied on a computer readable memory, and/or functions performed by logic implemented in hardware, in accordance with an exemplary embodiment of this invention.

To remedy this and similar scenarios, exemplary embodiments of this invention use string analysis (e.g., via in a larger static analysis that computes the call graph and pointer analysis for the program). FIG. 2 shows a graphical representation of how an enhanced string analysis is used to improve the accuracy of static analysis and particularly the call graph generation and pointer analysis. FIG. 2 further illustrates the operation of an exemplary method, a result of execution of computer program instructions embodied on a computer readable memory, and/or functions performed by logic implemented in hardware, in accordance with an exemplary embodiment of this invention. It is assumed in FIG. 2 that the computing device 135 (e.g., under control of the security analysis tool 140 as executed by the processor(s) 110) performs the blocks in the flow.

As an overview of FIG. 2, first, the string analysis determines the possible values to strings passed to functions that execute the strings as code dynamically such as eval. See blocks 205-220. Once the possible strings are obtained from string analysis, the computing device 135 modifies (block 230) the source program, either by augmenting the original source code (e.g., to create a modified program 165 from the program 160) or by augmenting an intermediate representation (e.g., as modified program 165) already in memory 145 from executing the analysis. At this point, the call graph generation and pointer analysis will update its results based on the new code. See block 240. This process may reveal new calls to functions that execute strings as code dynamically, so this entire process will repeat (blocks 350, 260, and 220-240) until a fixed point is reached (block 250=Yes). Furthermore, the flow may end in response to no new call being discovered or a timeout being reached (block 255).

More specifically, an exemplary flow is performed as follows, where it is assumed a program P 160 is analyzed. In block 205, the variable P[0] is set to the program P 160, and the variable is set to zero. In block 210, the call graph G[0] is generated (e.g., by the computing device 135 under control at least in part by the static analysis tool 150) by analyzing program P[0], where the call graph is a directed graph in which the nodes represent functions. Example call graphs are described in more detail below. Blocks 220, 230, 240, 250, and 260 are iterated through until a result is reported.

In block 220, a string analysis is performed (e.g., by the computing device 135 under the control at least in part of the enhanced string analysis tool 170) against program P[i] and call graph G[i] to determine the possible strings S passed to functions that execute strings as code, such as "eval", where the strings S are considered code fragments. The strings S are disambiguated, meaning that uncertainty is removed from the strings S. That is, a grammar of all possible strings for each variable is determined. In block 230, the program P[i+1] is created based on program P[i] by replacing all the calls of "eval" with the strings S. In an example, the grammar is used to determine how functions will be called and statements are determined, using the grammar, based on how the functions will be called. It is noted that the function "eval" is a function that will execute a string as code.

In block 240, the call graph G[i+1] is generated based on program P[i+1]. This process may reveal new calls to functions that execute code dynamically.

In response to G[i+1] is the subgraph of G[i] or equivalent to G[i] (block 250=Yes), G[i] is reported as the result (block 270). Otherwise (block 250=No), i is incremented by one (block 260), and the iteration of blocks 220-260 continues. It is noted that a subgraph of a graph G is a graph whose vertex set (of vertexes, commonly called nodes) is a subset of that of G, and whose edge set is a subset of that of G.

Figure 3:
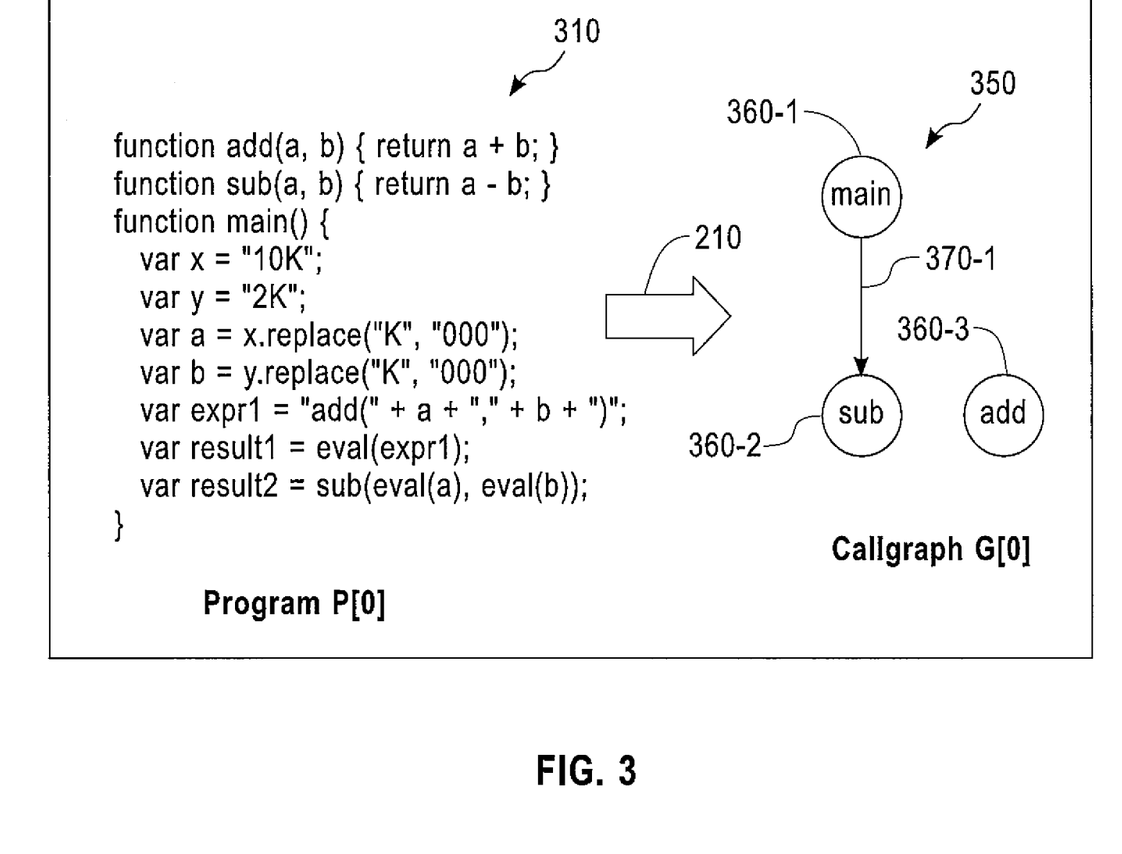
FIG. 3 shows an example of an enhanced string analysis of a program which contains two user-defined functions for addition and subtraction, where the addition function is called through the "eval" function, and shows a corresponding call graph, after a portion of the flow of FIG. 2.

An example is now presented. FIG. 3 shows an example of analyzing a program 310 (e.g., as program 160 of FIG. 1A), which contains two user-defined functions for addition and subtraction, where the addition function is called through the "eval" function. In block 205, the program P[0] 310 is obtained from a program P 160. In block 210 of FIG. 2, the call graph G[0] 350 is generated (and block 210 of FIG. 2 is illustrated by an arrow in FIGS. 3-5). The call graph G[0] 350 contains node (also called a vertex) 360-1 (corresponding to the "main" function in program 310), an edge 370-1 indicated a call to the "sub" (i.e., subtraction) function, as represented by the node 360-2. The node 360-3 corresponds to the "add" function in program 310. The program 310 contains the call of the "eval" function in the "var result1=eval(expr1)" and "var result2=sub(eval(a), eval(b))" statements. The "eval" function evaluates and/or executes an argument. Typical call graph analysis (e.g., performed in block 210) can determine the link (see edge 370-1) from the "main" function to the "sub" function, but cannot find the link from the "main" function (represented by the node 360-1) to the "add" function (represented by node 360-3) since the call of the "add" function is in the string that will be evaluated by the "eval" function in the call eval(expr1).

In block 220 of FIG. 2, the enhanced string analysis tool 170 determines the possible strings S passed to the "eval" functions based on the program P[i] (in this case, program P[0] 310) and the call graph G[i] (in this case, call graph G[0] 350). The enhanced string analysis tool 170 in block 220 therefore determines the string S of "add(10000, 2000)" for the "eval(expr1)" portion of the "var result1=eval(expr1)" statement. That is, the enhanced string analysis tool 170 determines that variable x is "10K" via the statement "var x="10K"" and determines that the variable a is "10000" based on the statement "var a=x.replace("K","000")". A similar analysis for variable b indicates that variable b is "2000". The variable expr1 therefore becomes "add(10000,2000)", where the string of "add(" defines at least in part a call to the add function. The function "eval(expr1)" therefore relies on the variables a and b, which are identified and on which a grammar for all possible strings are computed for each of the variables. The function "eval(expr1)" also relies on the expression "expr1" (of ""add("+a+","+b+")""). In this example, how the function will be called using the grammar is determined as "eval("add(10000,2000)")" and a statement based on this would be "add(10000,2000)". It is noted that the statement itself could include an expression (e.g., "add (10000+5,2000)", where "10000+5" is an expression. Furthermore, the strings for the variables may define at least in part call(s) to a function. For instance, in this example, "add(" is part of an expression that is evaluated. However, instead of "var expr1="add("+a+","+b+")"", assume the following: "var expr1=c+a+","+b+")"", and "var c="add("". Now, the variable expr1 relies on the variable c, which defines (at least in part) a call to the add function.

In the example of "eval("add(10000,2000)")", the argument of add(10000,2000)" will be executed. However, there could also be an evaluation involved, such as "eval ("x=10000; y=2000, add(x,y)")", which after evaluation would yield "eval("add(10000,2000)")".

The enhanced string analysis tool 170 in block 220 also determines the string S of "10000" for the "eval(a)" portion and the string S of "2000" for the "eval(b)" portion of the "var result2=sub(eval(a), eval(b))" statement.

In block 230 of FIG. 2, the program P[i+1] (in this case, P[0+1] or P[1]) is created based on the program P[i] (in this case, P[0]) by replacing all the calls of "eval" with the strings S. The result is the program 410 shown in FIG. 4, wherein the enhanced string analysis tool 170 has replaced the call "eval (expr1)" in the "var result1=eval(expr1)" statement with the previously determined string "add(10000, 2000)". The enhanced string analysis tool 170 has replaced the call "eval (a)" with the previously determined string "10000" and has replaced the call "eval(b)" with the previously determined string "2".

Figure 4:
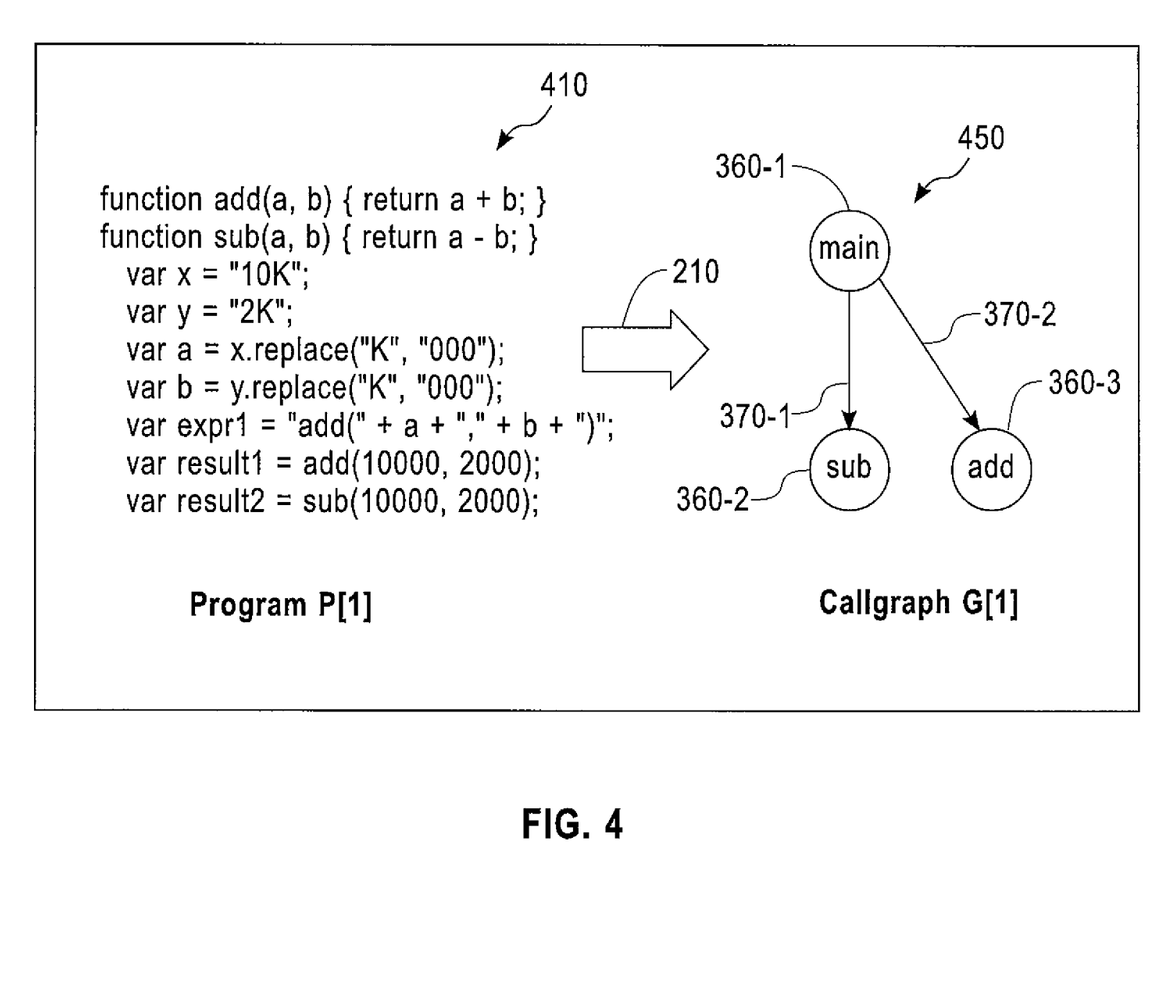
FIG. 4 shows another example of the enhanced string analysis of the program of FIG. 3 and shows a corresponding call graph, after an iteration through portion of the flow of FIG. 2.

In block 240, the enhanced string analysis tool 170 generates a call graph G[i+1] (in this case, G[0+1] or g[1] 450), which has the link (shown as edge 370-2) from the "main" function represented by the node 360-1 to the "add" function represented by the node 360-3. That is, the enhanced string analysis tool 170 did what the static analysis tool 150 could not do, which is determine the link (as illustrated by edge 370-2) between the main and add functions.

Figure 5:
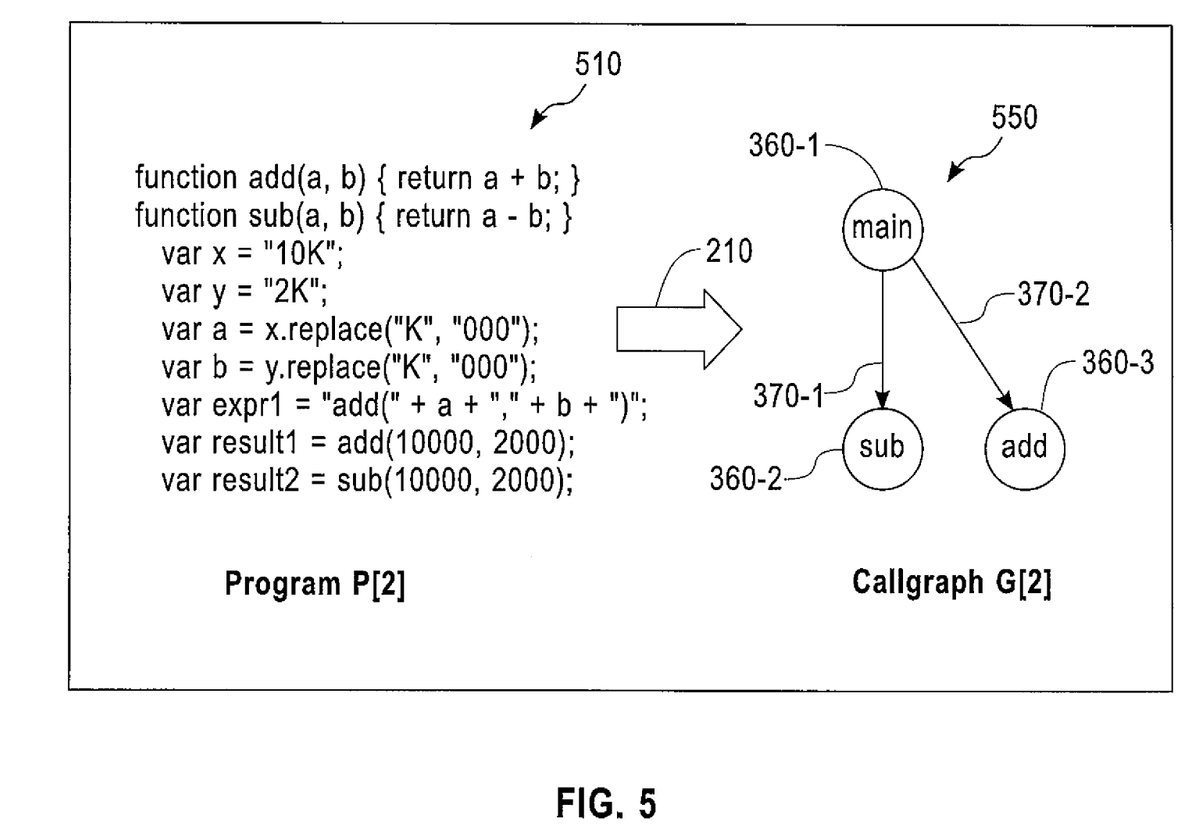
FIG. 5 shows another example of the enhanced string analysis of the program of FIG. 4 and shows a corresponding call graph, after iteration through portion of the flow of FIG. 2.

In this example, G[1] 450 is not a subgraph of G[0] 350 (block 250 of FIG. 2=No), so the flow iterates through blocks 260, 220, 230, and 240, where as shown in FIG. 5 a "new" program P[2] 510 and the corresponding call graph G[2] 550 are obtained. The call graph G[1] is reported (block 270 of FIG. 2) as a result since G[2] 550 is equivalent to G[1] 450. It is noted that block 270 reports a conservative result, which means the resulting graph has all the potential edges and nodes, and so G[i] should is a result, since G[i] contains all the nodes and edges of G[i+1] because of the termination condition of the algorithm (G[i+1] is a subgraph of G[i] or is the same as G[i]).

It can be seen that the reported call graph G[1] 450 has an extra link, in this case edge 370-2, between functions main (represented by node 360-1) and add (represented by node 360-3, which is not present in call graph G[0].

Although the eval function has been used as an example, other functions are also possible. For instance, many JAVA-SCRIPT® implementations have "setTimeout" and "setInterval", each of which calls a function or evaluates an expression.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   determining by a computer system, as part of a static analysis of a program, links between functions in the program;
   generating by a computer system a call graph corresponding to the program based on the determining;
   performing by a computer system, as part of the static analysis, string analysis on strings used in the program to determine, based on the call graph, additional links between the functions in the program, wherein performing the string analysis comprises:
      identifying calls in the program to functions that execute strings as code and that will dynamically call functions in the program based on the executed strings;
      identifying variables on which the identified calls depend; and
      analyzing the code with the identified variables to produce statements in a source program language in which the program is written, wherein the statements call the functions in the program that would be called by the functions that execute strings as code, wherein the statements replace the identified calls to the functions that execute strings as code, and wherein the calls to the functions in the program provide the additional links between the functions in the program; and
   outputting by a computer system in a first modified version of the call graph, as part of the static analysis, indications of at least the links between the functions and the additional links between the functions.

2. The method of claim 1, wherein performing string analysis disambiguates the strings and transforms the strings into statements in a source program language in which the program is written, wherein the statements call functions in the program and wherein the calls provide the additional links between the functions in the program.

3. The method of claim 2, wherein performing string analysis further comprises modifying the program based on the produced statements to create a modified program incorporating the produced statements and using the modified program to determine the additional links between the functions.

4. The method of claim 1, wherein the calls to functions that execute strings as code comprise corresponding arguments and wherein the arguments comprise one or more of strings defining at least in part a call to a function in the program, or one or more variables that are strings, and one or more expressions involving the one or more strings and one or more variables.

5. The method of claim 4, wherein the one or more variables comprise stings defining at least in part a call to a function in the program.

6. The method of claim 4, wherein the functions that execute string as code also evaluate the corresponding argument to a resultant string and execute the resultant string.

7. The method of claim 1, wherein identifying the variables comprises computing a grammar of all possible strings for each variable, and wherein analyzing the code comprises determining how functions will be called using the grammar and producing the statements based on how the functions will be called using the grammar.

8. The method of claim 1, wherein performing the string analysis further comprises modifying the program based on the produced statements to create a modified program incorporating the produced statements and performing the identifying calls, identifying the variables, and analyzing the code until at least one criterion is met.

9. The method of claim 8, wherein:
   performing the string analysis modifies the call graph to create the first modified version of the call graph;
   the first modified version of the call graph corresponds to a previous modified program and a second modified version of the call graph corresponds to a current modified program; and
   the at least one criterion is one of the second modified version of the call graph is a subgraph of the first modified version of the call graph or the first and second modified versions of the call graphs are equivalent.

10. The method of claim 8, wherein the at least one criterion is a timeout occurrent.

11. The method of claim 1, wherein:
   generating the call graph using results from a pointer analysis mapping variables to functions; and
   performing the string analysis further comprises adding the additional links between functions in the program into the first modified version of the call graph.

12. The method of claim 1, wherein the program comprises at least one of source code and byte code.

13. A computing system comprising:
   one or more memories comprising computer-readable code; and
   one or more processors, configured in response to executing the computer-readable code to cause the computing system to perform or control at least the following:
   determining, as part of a static analysis of a program, links between functions in the program;
   generating a call graph corresponding to the program based on the determining;
   performing, as part of the static analysis, string analysis on strings used in the program to determine, based on the call graph, additional links between the functions in the program, wherein performing the string analysis comprises:
      identifying calls in the program to functions that execute strings as code and that will dynamically call functions in the program based on the executed strings;
      identifying variables on which the identified calls depend; and
      analyzing the code with the identified variables to produce statements in a source program language in which the program is written, wherein the statements call the functions in the program that would be called by the functions that execute strings as code, wherein the statements replace the identified calls to the functions that execute strings as code, and wherein the calls to the functions in the program provide the additional links between the functions in the program; and outputting in a first modified version of the call graph, as part of the static analysis, indications of at least the links between the functions and the additional links between the functions.

14. The computing system of claim 13, wherein performing string analysis disambiguates the strings and transforms the strings into statements in a source program language in which the program is written, wherein the statements call functions in the program and wherein the calls provide the additional links between the functions in the program.

15. The computing system of claim 14, wherein performing string analysis further comprises modifying the program based on the produced statements to create a modified program incorporating the produced statements and using the modified program to determine the additional links between the functions.

16. The computing system of claim 13, wherein the calls to functions that execute strings as code comprise corresponding arguments and wherein the arguments comprise one or more of strings defining at least in part a call to a function in the program, or one or more variables that are strings, and one or more expressions involving the one or more strings and one or more variables.

17. The computing system of claim 16, wherein the one or more variables comprise stings defining at least in part a call to a function in the program.

18. The computing system of claim 16, wherein the functions that execute string as code also evaluate the corresponding argument to a resultant string and execute the resultant string.

19. The computing system of claim 13, wherein identifying the variables comprises computing a grammar of all possible strings for each variable, and wherein analyzing the code comprises determining how functions will be called using the grammar and producing the statements based on how the functions will be called using the grammar.

20. The computing system of claim 13, wherein performing the string analysis further comprises modifying the program based on the produced statements to create a modified program incorporating the produced statements and performing the identifying calls, identifying the variables, and analyzing the code until at least one criterion is met.

21. The computing system of claim 20, wherein:
performing the string analysis modifies the call graph to create the first modified version of the call graph;
the first modified version of the call graph corresponds to a previous modified program and a second modified version of the call graph corresponds to a current modified program; and
the at least one criterion is one of the second modified version of the call graph is a subgraph of the first modified version of the call graph or the first and second modified versions of the call graphs are equivalent.

22. The computing system of claim 13, wherein:
generating the call graph using results from a pointer analysis mapping variables to functions; and
performing the string analysis further comprises adding the additional links between functions in the program into the first modified version of the call graph.

23. A computer program product comprising a non-transitory computer readable storage medium having computer readable program code embodied therewith, the computer readable program code comprising at least code for:
determining, as part of a static analysis of a program, links between functions in the program;
generating a call graph corresponding to the program based on the determining;
performing, as part of the static analysis, string analysis on strings used in the program to determine, based on the call graph, additional links between the functions in the program, wherein performing the string analysis comprises:
identifying calls in the program to functions that execute strings as code and that will dynamically call functions in the program based on the executed strings;
identifying variables on which the identified calls depend; and
analyzing the code with the identified variables to produce statements in a source program language in which the program is written, wherein the statements call the functions in the program that would be called by the functions that execute strings as code, wherein the statements replace the identified calls to the functions that execute strings as code, and wherein the calls to the functions in the program provide the additional links between the functions in the program; and
outputting in a first modified version of the call graph, as part of the static analysis, indications of at least the links between the functions and the additional links between the functions.

* * * * *